United States Patent [19]

Johnson et al.

[11] 3,768,854
[45] Oct. 30, 1973

[54] WIND DEFLECTOR FOR A TOWED TRAILER

[76] Inventors: Daniel H. Johnson, Rt. 1, Chariton, Iowa 50049; Harry T. Johnson, Box 83, Williamson, Iowa 50272

[22] Filed: Oct. 26, 1971

[21] Appl. No.: 192,221

[52] U.S. Cl. ............................................. 296/1 S
[51] Int. Cl. ............................................. B62d 35/00
[58] Field of Search ............... 296/1 S, 91, 95 R; 248/455, 456; 241/121

[56] References Cited
UNITED STATES PATENTS

| | | | |
|---|---|---|---|
| 3,596,974 | 3/1969 | Adams | 296/1 S |
| 2,107,049 | 2/1938 | Young | 248/456 |
| 2,633,381 | 3/1953 | Francis | 296/95 R |
| 1,390,938 | 9/1921 | Thompson | 248/456 |
| 2,108,289 | 2/1938 | Laddon | 244/121 |
| 2,220,715 | 11/1940 | Heintz | 296/91 |
| 2,588,694 | 3/1952 | Bracken | 296/95 R |
| 3,309,131 | 3/1967 | Saunders | 296/1 S |
| 3,484,130 | 12/1969 | Read | 296/1 S |

*Primary Examiner*—Leo Friaglia
*Assistant Examiner*—John A. Pekar
*Attorney*—Morton S. Adler

[57] ABSTRACT

A wind deflector which is detachably and adjustably mounted to the roof of a vehicle to which a trailer is hitched whereby the wind is deflected upwardly so as to pass over the trailer and reduce the wind resistance which the trailer normally presents.

6 Claims, 7 Drawing Figures

Patented Oct. 30, 1973
3,768,854
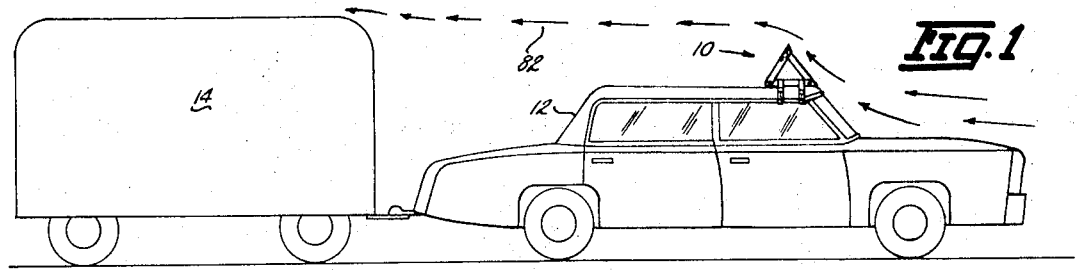
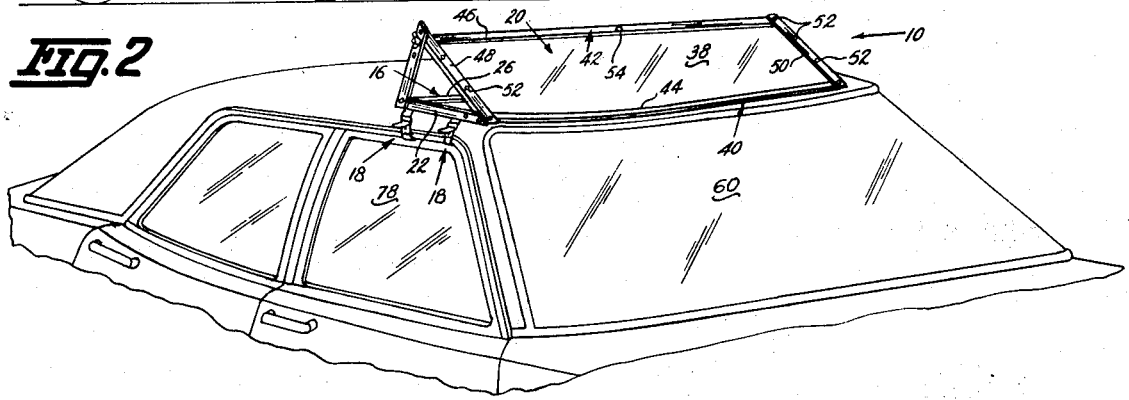
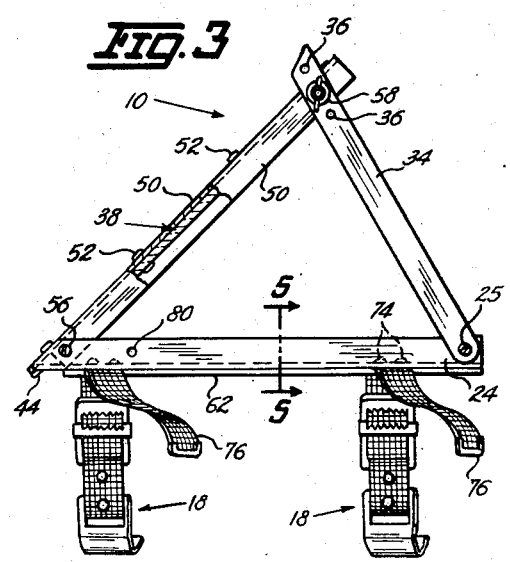
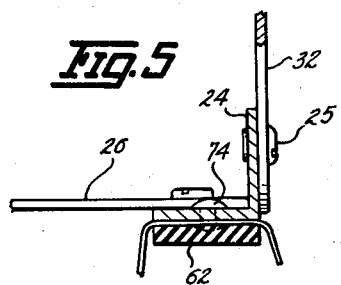
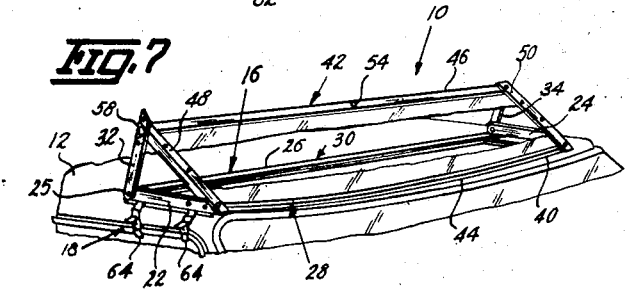
INVENTORS.
DANIEL H. JOHNSON
HARRY T. JOHNSON
BY 
ATTORNEY.

WIND DEFLECTOR FOR A TOWED TRAILER

BACKGROUND OF THE INVENTION

This invention relates to a wind deflector designed particularly for use on vehicles having a trailer hitched thereto.

Over the past several years, the so-called travel trailer has found increasingly wide acceptance with the motoring public and is available in many forms and styles which vary from fold-down and collapsible types to upright trailers which are more or less of a box-like shape, being approximately the same width as the pulling vehicle and also generally somewhat higher than the roof of the vehicle. The towing of such trailers and particularly the upright trailers on the modern highways at relatively high speeds produces considerable wind resistance that increases the problems of control for the vehicle operator, reduces the overall efficiency of the pulling vehicle and substantially increases the per mile gasoline consumption. Accordingly, one of the important objects of the present invention is to provide a wind deflector device which can be suitably mounted on the roof of the towing vehicle so as to deflect the wind and air upwardly, rearwardly and over the towed trailer.

A further object herein is to provide a wind deflector of the above class which can be easily mounted to and removed from the towing vehicle without the use of any tools and which can be conveniently adjustable as to its angle of air deflection and can be adjusted to both operable and inoperable positions.

Still another object herein is to provide a deflector type shield on a towing vehicle in relation to a towed trailer whereby small flying objects in the air that would normally strike the towed trailer can be deflected away from such trailer.

SUMMARY

The present invention comprises a windshield-type of wind deflector which is designed to be detachably mounted to the roof of a towing vehicle just rearwardly of the normal vehicle windshield so that it will provide a further upward deflection of the wind as it passes upwardly from the normal windshield. A suitable frame support is utilized and is detachably secured to the vehicle by appropriate hooks and straps in a manner not dissimilar from the attaching means for various well known luggage carrier devices. A framed deflector shield preferably of transparent material or the like is suitably mounted to a supporting frame whereby the degree of inclination of the deflector can be selectively adjusted. By the use of this wind deflector device, the air normally passing across the top of the vehicle is deflected to a higher level sufficiently to pass over a towed trailer and thereby eliminate the normal wind resistance of the trailer and the drag on the towing vehicle that is normally encountered.

Adjustment means are provided whereby this wind deflector can be moved to a folded position parallel to the top of the vehicle if it is desired not to remove the entire device when the vehicle is not being used to tow a trailer.

The objects of this invention together with details of the operation outlined and the advantages of the same will be more fully described and developed in relation to the more detailed description of the accompanying drawings.

BRIEF DESCRIPTION OF THE DRAWINGS

FIG. 1 is a schematic view illustrating our new wind deflector on a vehicle towing an upright trailer, FIG. 2 is an enlarged perspective view of the upper portion of the towing vehicle showing our wind deflector mounted thereon, FIG. 3 is a side view of this wind deflector showing the same in extended or operating position, FIG. 4 is a side view similar to FIG. 3 but showing the wind deflector component folded into a storage or non-operating position, FIG. 5 is a cross sectional view taken on the line 5—5 of FIG. 3, FIG. 6 is a side view taken from the line 6—6 of FIG. 4 to illustrate the one piece strap component, and FIG. 7 is a perspective view of this deflector in place on a vehicle top with portions cut away to more fully illustrate the construction thereof.

DESCRIPTION OF THE PREFERRED EMBODIMENTS

Referring to the drawings, our new wind deflector is indicated generally by the numeral 10 as best seen in FIG. 2 where it is shown in its working position on the roof of a vehicle 12 and, as seen in FIG. 1, the deflector 10 is positioned so as to deflect air currents over and above the towed upright trailer 14.

The deflector 10 comprises generally a support frame 16, a strap assembly 18 attached to frame 16 and a deflector assembly 20 adjustably attached to frame 16 as will appear.

The frame 16 is preferably made of extruded angle aluminum although it will be appreciated that any other suitable material may be used. Such frame includes a pair of relatively widely spaced parallel runners 22 and 24 connected at corresponding ends by the bar 26 as best seen in FIG. 7. Thus arranged, frame 16 is of elongated shape, having one open elongated side which will be referred to as the front side 28 and the closed or rear side 30. At the rear end of each runner 22 and 24 there is pivotally secured by the nut and bolt 25 the respective lower ends of the adjustment arms 32 and 34 and each of these arms at their upper portion are provided with a plurality of longitudinally spaced openings 36 as best seen in FIGS. 3 and 4.

The deflector assembly 20 comprises an elongated rectangular flat and preferably bendable deflector component or member 38 which we preferably make of transparent material to give it a windshield-like appearance although it will be understood that it may be made of any other suitable material. For purposes of description, the deflector member 38 has the leading edge 40 and the trailing edge 42. The leading edge 40 is provided with a protective stripping 44 and the trailing edge 42 is preferably covered by a relatively lightweight metal reinforcing strip 46. At each side edge of deflector 38 intermediate the leading edge 40 and the trailing edge 42 there is provided the angle-shaped frame segments 48 and 50 to which the deflector 38 is suitably secured as by rivets 52 and, likewise, a rivet 54 is also used for securing reinforcing strip 46 to member 38 as best seen in FIG. 2.

With the deflector assembly 20 constructed and arranged as described, the ends of the frame members 48 and 50 adjacent the leading edge 40 are respectively pivotally secured to forward ends of the respective runners 22 and 24 by any suitable means such as a rivet or a bolt and nut represented by the numeral 56. The rear end of frame members 48 and 50 are detachably pivotally secured to the respective arms 32 and 34 at the point of any one of the holes 36 and for this purpose we preferably use a bolt and wing nut component 58. For purposes of description, it is pointed out that we preferably make deflector 38 approximately 48 inches long and 12 inches high although these dimensions, of course, may be varied and by attaching assembly 20 to the central hole 36 in arms 32 and 34, deflector 38 will be approximately on a 45° angle relative to the plane of the supporting runners 22 and 24.

The suggested length of member 38 is such that it will extend approximately from side to side of an ordinary vehicle as illustrated in FIGS. 2 and 7 and is designed to be placed upon the roof of the vehicle so that the leading edge 40 is closely adjacent the top of the vehicle windshield 60 as shown. To avoid any scratching or marring of the vehicle top, the bottom of the support frame 22 and 24 and the bottom of the connecting bar 26 are all provided with a suitable protective strip or covering 62.

Deflector 10 is designed to be detachably arranged relative to the vehicle 12 and for this purpose we have utilized the strap assembly 18 for which no invention is claimed per se since it is a common form of attaching means for car top carriers and other like devices. The strap assembly 18 as best seen in FIGS. 3, 4 and 6 includes a hook member 64 attached to an appropriate strap 66 that is provided with a loop 68 on which there is arranged an appropriate buckle 70. Strap 66 is riveted to itself as at 72 and then extends across the underside of runner 24 to which it is riveted as at 74 as seen in FIG. 6 and then continues as illustrated at 76. The protective stripping 62 extends over the strap and rivet 74. Preferably, there are two strap assemblies 18 as described and as seen in FIG. 6 on each of the runners 22 and 24 and it will be understood that hook 64 is engaged on the vehicle just above the front window 78 of the vehicle in a well known manner and strap length 76 can then be engaged with the buckle 70.

While this deflector 10 may be easily and quickly mounted to or removed from a vehicle by means of the strap assemblies 18, there may be times and occasions where the complete removal of the deflector is not desired although the extended or operating position of the deflector 38 may not be necessary such as when the trailer 14 may be detached for temporary periods. Accordingly, it has been provided to fold the deflector assembly 10 to an inoperating position and this is accomplished by removing the wing nut 58 so as to disengage bars 32 and 34 from the deflector assembly 20 whereby such deflector assembly is foldable to a horizontal position as seen in FIG. 4 and at the same time, arms 32 and 34 are foldable downwardly adjacent runners 22 and 24. In this position, the frame members 48 and 50 together with the arms 32 and 34 are substantially planar with runners 22 and 24 and the wing nut 58 can be repositioned as seen in FIG. 4 to secure the arms 32 and 34 to the respective frames 48 and 50 and also to the runners 22 and 24 for which purpose there is provided the hole 80 in the runners as best seen in FIG. 3.

Deflector 10 when constructed, arranged and mounted as described is illustrated generally in FIG. 1 as to its manner of use. In this position due to the angled position of deflector 30, the leading edge 40 covered by the protective strip 44 will be in abutting engagement with the vehicle roof when strap assemblies 18 are drawn tight and this is due to the bendable capability of deflector 38. The particular angle of inclination of the deflector component 20 can be adjusted as described as may be required by the type of trailer 14 which is being towed whereby the wind normally deflected by the windshield 60 is further deflected upwardly so as to pass substantially over the trailer as represented by the arrows 82. The obvious effect of this, of course, not only eliminates the ordinary drag of the vehicle by the wind resistance of the trailer but actually increases the ease and the facility and the economy by which the trailer can be towed by reason of the fact that the deflection of the air substantially reduces the air content immediately following the vehicle so that the trailer travels with a minimum of air resistance. Accordingly, from the foregoing it is thought that a full and complete understanding of the construction and operation of this device will be had and the advantages of the same will be appreciated.

We claim:

1. A wind deflector for a vehicle pulling a trailer, comprising:
   a support frame including spaced runners each having a respective forward and rear end,
   an elongated bendable flat deflector member having a respective trailing and leading edge,
   means for securing the respective opposite ends of said leading edge of said deflector member to the respective forward ends of said runners so that said leading edge extends between the forward ends of said runners in contact with the roof of the vehicle and said deflector member extends upwardly and rearwardly therefrom to said trailing edge.
   support means on the rear ends of said runners operatively connected to the trailing edge of said deflector member, and
   means for removably securing said support frame to the roof of a vehicle so that the forward ends of said runners are in close proximity to the vehicle windshield and said runners are in abutting contact with the surface of the vehicle roof and with said means acting to hold and maintain the leading edge of said deflector member in abutting contact with the vehicle roof whereby air is deflected only upwardly to pass over the vehicle and trailer and is prevented from passing beneath said deflector member to thereby reduce the air content rearwardly thereof.

2. A wind deflector as defined in claim 1 including:
   means for pivotally securing the respective opposite ends of said leading edge to the forwards ends of said runners,
   said support means comprising,
   a respective upstanding rigid support arm secured at its lower end to the respective rear ends of said runners, and
   means for selectively removably securing the respective opposite ends of said trailing edge to selected longitudinal points on said upstanding support arms whereby the angle of inclination of said wind deflector relative to the roof of the vehicle can be varied.

3. A wind deflector as defined in claim 2 including:
   means for pivotally securing said respective upstanding support arms to said runners whereby upon detachment of said trailing edge from said support arms, said arms and said wind deflector are movable to a folded position in substantial parallel and juxtaposition with each other and with said runners, and means for releasably securing said support arms and said wind deflector to said runners when in folded position.

4. A wind deflector as defined in claim 1 including a protective covering on that part of said support frame being in contact with the roof of the vehicle.

5. A wind deflector as defined in claim 1 including:

said deflector being of transparent material,
rigid mounting strips secured to respective side edges of said deflector,
a stiffener member secured to said trailing edge, and
a protective covering secured to said leading edge.

6. A wind deflector as defined in claim 1 including:

a rigid member connecting the rear ends of said runners to define a closed rear end of said frame support, and
the front end of said frame support being open.

* * * * *